(12) United States Patent
Pienaar (10) Patent No.: US 12,083,820 B2
(45) Date of Patent: Sep. 10, 2024

(54) LUBRICATION OF A WHEEL SUPPORT

(71) Applicant: Phillips Global (Pty) Ltd, Middelburg (ZA)

(72) Inventor: Abel Albertus Pienaar, Middelburg (ZA)

(73) Assignee: Phillips Global (Pty) Ltd (ZA)

( * ) Notice: Subject to any disclaimer, the term of this patent is extended or adjusted under 35 U.S.C. 154(b) by 542 days.

(21) Appl. No.: 17/312,607

(22) PCT Filed: Dec. 11, 2019

(86) PCT No.: PCT/IB2019/060654
§ 371 (c)(1),
(2) Date: Jun. 10, 2021

(87) PCT Pub. No.: WO2020/121213
PCT Pub. Date: Jun. 18, 2020

(65) Prior Publication Data
US 2022/0041012 A1 Feb. 10, 2022

(30) Foreign Application Priority Data

Dec. 11, 2018 (ZA) .................... 2018/08339

(51) Int. Cl.
*B60B 19/08* (2006.01)
*F16H 57/04* (2010.01)
*F16N 13/10* (2006.01)

(52) U.S. Cl.
CPC ......... *B60B 19/08* (2013.01); *F16H 57/0424* (2013.01); *F16H 57/0441* (2013.01); *F16N 13/10* (2013.01); *B60B 2900/321* (2013.01)

(58) Field of Classification Search
CPC .. F16H 57/0424; F16H 57/0441; F16N 13/10; B60B 19/08; F16C 33/1025; F16C 33/1045; B62D 7/142; B62D 7/144
See application file for complete search history.

(56) References Cited

U.S. PATENT DOCUMENTS 1,874,305 A * 8/1932 Kearney ................... F16D 3/42
184/6.14
1,891,858 A * 12/1932 Williams .................. F16D 3/42
464/14

(Continued)

OTHER PUBLICATIONS

WIPO Application No. PCT/IB2019/060654, PCT International Search Report and Written Opinion of the International Searching Authority mailed May 12, 2020.

*Primary Examiner* — Minh Truong
(74) *Attorney, Agent, or Firm* — Schwabe, Williamson & Wyatt PC (57) ABSTRACT

This invention relates to the lubrication of a wheel support 10. The wheel support 10 comprises support 10 comprises a housing 12 that includes a base portion 14 defining a cavity 16 for receiving therein at least one gear 40, and lubricant for lubricating the gear 40. Opposing first and second arm members 18.1, 18.2 extend respectively from the base portion 14. A free end of each arm member 18.1, 18.2 includes a bearing receiving formation 20.1, 20.2 for receiving therein a bearing. The wheel support 10 further comprises internal lubricant feed means 22, defined in the housing 12, and that extends internally from the base portion 14 into at least one of the arm members 18.1 or 18.2 for feeding lubricant operatively received from a lubricant supply, internally, via the base portion 14, to the bearing receiving formation 20.1 or 20.2 associated with the at least one arm member 18.1 or 18.2.

8 Claims, 9 Drawing Sheets

(56) References Cited

U.S. PATENT DOCUMENTS

| | | | | |
|---|---|---|---|---|
| 2,024,410 A | * | 12/1935 | Williams | F16D 3/41 |
| | | | | 464/130 |
| 2,312,304 A | * | 3/1943 | Anderson | F16N 13/10 |
| | | | | 92/13.8 |
| 2,876,636 A | * | 3/1959 | Thackeray | F16D 3/16 |
| | | | | 464/14 |
| 3,302,739 A | | 2/1967 | Beck et al. | |
| 3,326,323 A | * | 6/1967 | Delker | F16D 3/40 |
| | | | | 184/26 |
| 3,785,460 A | * | 1/1974 | Smith | F16N 7/363 |
| | | | | 184/77 |
| 3,907,070 A | * | 9/1975 | Cheek | F16N 13/10 |
| | | | | 417/415 |
| 3,991,855 A | * | 11/1976 | Heintzelman | F16D 3/40 |
| | | | | 184/6 |
| 4,352,301 A | | 10/1982 | Fleury | |
| 4,468,981 A | | 9/1984 | Ries | |
| 4,841,797 A | * | 6/1989 | Cerrington | F16H 57/0457 |
| | | | | 184/6.12 |
| 5,263,552 A | * | 11/1993 | Cline | F16D 3/41 |
| | | | | 184/6.28 |
| 5,540,300 A | | 7/1996 | Downs et al. | |
| 8,475,319 B2 | | 7/2013 | Forssberg | |
| 8,960,362 B2 | * | 2/2015 | Barbir | F16H 57/0483 |
| | | | | 184/6.12 |
| 9,238,386 B2 | | 1/2016 | Dockstader et al. | |
| 9,377,099 B2 | | 6/2016 | Gianone et al. | |

* cited by examiner

LUBRICATION OF A WHEEL SUPPORT

CROSS-REFERENCE TO RELATED APPLICATIONS

This Application is a US National Stage Application under 35 USC § 371 of PCT/IB2019/060654, filed Dec. 11, 2019, which claims the benefit of South African Patent Application No. 2018/08339, filed Dec. 11, 2018, each of which is herein incorporated by reference in its entirety.

FIELD OF THE INVENTION

This invention relates to a wheel support. More particularly, but not exclusively, this invention relates to the lubrication of a wheel support to prolong the life expectancy of the wheel support and associated components. The invention also relates to a method of lubricating a wheel support.

BACKGROUND TO THE INVENTION

Shuttle cars are commonly used to transport newly mined materials away from a mine face. Typically, shuttle cars include two wheel units on each side thereof whereto the car's wheels are mounted to propel and steer the car, as is well known in the art.

Each of these wheel units comprises a wheel support that includes a housing having a base portion that is operatively attached to the car and opposing arm members that extend respectively from opposing sides of the base portion. A bearing is located in the proximity of the free end of each of the arm members to facilitate steering.

Currently, the bearings are lubricated by means of lubrication lines that run, externally of the housing, from a central lubrication manifold of the car to each of the bearings. The manifold is operatively connected to a supply of pressurised lubricant, and from the manifold the lubricant is distributed to the desired components on the car that requires lubricant from time to time.

A first problem associated with the existing manner in which the bearings are lubricated is that at least some bearings are located in close proximity to the ground and are unprotected which make the lubrication lines connected thereto vulnerable to damage. It often happens that such exposed lines are damaged and/or become disconnected from the housing as a result of rocks or other objects that hit them as the car navigates over gravel terrain. As a result, when lubricant is fed from the manifold, it does not reach its intended destination and gets spilt on the ground.

Furthermore, the current lubrication method known to the applicant relies on workers to lubricate the bearings at scheduled intervals. It is common for workers to deviated from the lubrication schedule, resulting in the bearing being lubricated inadequately.

It is well known that under lubricated bearings are prone to early failure. Also, in some instances, under lubricated bearings place additional stress on associated components that could lead to their early failure.

OBJECT OF THE INVENTION

It is accordingly an object of the present invention to provide for more effective lubrication of a wheel support.

SUMMARY OF THE INVENTION

According to a first aspect of the invention, there is provided a wheel support comprising:

a housing including a base portion defining a cavity for receiving at least one gear and lubricant for lubricating the gear, and opposing first and second arm members extending from the base portion such that they are spaced from each other, wherein each arm member includes a bearing receiving formation for receiving a bearing; and internal lubricant feed means extending internally from the base portion into at least one of the arm members, for feeding lubricant from a lubricant supply, via the base portion, to the bearing receiving formation associated with the at least one arm member.

According to an example embodiment of the invention, the internal lubricant feed means may be connectable to the lubricant supply such to be in fluid flow communication with it, and the lubricant supply is a supply of pressurised lubricant located external of the wheel support. Preferably, the internal lubricant feed means may be connectable to the lubricant supply at an operatively upper half of the housing. Most preferably, the internal lubricant feed means may be connectable to the lubricant supply at an operatively upper region or end of the housing.

The internal lubricant feed means may include:

a first internal lubricant feed passage, defined in the housing, that has a first external inlet defined in the exterior of the housing that is connectable to the lubricant supply such to be in fluid flow communication with the lubricant supply and to receive lubricant from it, and a first outlet, forwardly spaced from the first external inlet, disposed for operatively dispensing lubricant in the bearing receiving formation in the first arm member; and a second internal lubricant feed passage, defined in the housing, that has a second external inlet defined in the exterior of the housing that is connectable to the lubricant supply such to be in fluid flow communication with the lubricant supply and to receive lubricant from it, and a second outlet, forwardly spaced from the second external inlet, disposed for operatively dispensing lubricant in the bearing receiving formation in the second arm member.

There is provided for internal lubricant feed means to extend internally from the base portion into each of the arm members, for feeding lubricant from the lubricant supply, via the base portion, to the bearing receiving formations.

Preferably, the first and second external inlets may be located in an operatively upper half of the housing. More preferably, the first and second external inlets may be located in proximity of an operatively upper region or end of the housing. Most preferably, the first and second external inlets may be located in an operatively upper arm member.

According to a further example embodiment of the invention, the internal lubricant feed means may be connected to and be in fluid flow communication with the cavity, and the lubricant supply may be lubricant located in the cavity.

The internal lubricant feed means may include:

a first internal lubricant feed passage, defined in the housing, that has a first internal inlet connected to and in fluid flow communication with the cavity such to operatively receive lubricant from it, and a first outlet, forwardly spaced from the first internal inlet, disposed for operatively dispensing lubricant received from the cavity in the bearing receiving formation in the first arm member, and a second internal lubricant feed passage, defined in the housing, that has a second internal inlet connected to and in fluid flow communication with the cavity such to operatively receive lubricant from it, and a second outlet, forwardly spaced from the second internal inlet, disposed for operatively dispending lubricant received from the cavity in the bearing receiving formation in the second arm member.

According to an example embodiment of the invention, there is provided for the internal lubricant feed means to further include lubricant pump means being in fluid flow communication with the cavity and the first and second internal inlets for operatively feeding lubricant, under pressure, from the cavity to the bearing receiving formations in the first and second arm members.

The lubricant pump means may include at least a first lubricant pump that protrudes, at least partially, into the cavity wherein it is disposed to operatively engage the gear and adapted to, as a result of such engagement, cause lubricant to be fed from the cavity to the respective bearing receiving formations.

According to one embodiment of the invention, the first lubricant pump is, at least partially, embedded in the housing, more particularly in the base portion of the housing. The depth of the first lubricant pump in the housing is adjustable to thereby alter the distance it protrudes into the cavity. Preferably, the depth of the first lubricant pump in the housing is adjustable by way of a screw interface between the first lubricant pump and the housing, whereby rotation of the first lubricant pump causes it to move into or out of the housing depending on the direction of rotation.

There is further provided for part of the first lubricant pump to be disposed in a path that a protrusion extending from the gear moves along when the gear operatively rotates, whereby the part of the first lubricant pump engages the protrusion when they are in register with one another.

The part of the first lubricant pump may comprise an actuating element that is linearly displaceable between a forward position wherein it is disposed in the path of movement of the protrusion, and a retracted position wherein it is retracted from the path of movement of the protrusion, further wherein lubricant is caused to be fed from the cavity to the bearing receiving formations when the actuating element is operatively displaced from its forward position to its retracted position as a result of its engagement with the protrusion. Preferably, the actuating element may be biased towards its forward position.

According to an example embodiment of the invention, the first lubricant pump is in fluid flow communication with the cavity and the first internal inlet for operatively feeding lubricant, under pressure, from the cavity to the bearing receiving formation in the first arm member, and the lubricant pump means also includes a second lubricant pump that is similar to the first lubricant pump defined above, save for it being in fluid flow communication with the cavity and the second internal inlet for operatively feeding lubricant, under pressure, from the cavity to the bearing receiving formation in the second arm member.

The first and second lubricant feed passages may respectively extend from the base portion into each of the arm members.

There is also provided for the first arm member to extend substantially in an operatively slanted upwardly direction from the base portion, and for the second arm member to extend substantially in an operatively slanted downwardly direction from the base portion.

The base portion may be operatively mounted to a vehicle frame, for example, a frame of a shuttle car.

The lubricant may be in the form of grease or oil.

The gear may be a bevel crown gear.

There is provided for the gear to, in use, transmit rotational movement to a wheel mounted to the wheel support.

According to a second aspect of the invention, there is provided a method of lubricating bearing receiving formations in a wheel support, the wheel support comprising a housing including a base portion defining a cavity for receiving at least one gear and lubricant for lubricating the gear, and opposing first and second arm members extending from the base portion such that they are spaced from each other, wherein each arm member includes a bearing receiving formation for receiving a bearing, the method including the step of feeding lubricant internally from the base portion via at least one of the arm members to the bearing receiving formation associated with the at least one arm member.

According to an example embodiment of the invention, the lubricant is received by the wheel support at an operatively upper half of the housing. Preferably, the lubricant is received by the wheel support at the proximity of an operatively upper region or end of the housing.

The lubricant may be fed internally from the base portion via each of the arm members to the bearing receiving formations.

According to a further example embodiment, the method includes
  extracting lubricant from the cavity;
  pressurising the extracted lubricant; and
  feeding the pressurised lubricant to the bearing receiving formations.

There is provided for the lubricant to be extracted, pressurised and fed to the bearing receiving formations due to the gear engaging a lubricant pump that is, at least partially, disposed in the cavity.

According to a third aspect of the invention, there is provided a shuttle car including a wheel support, as defined above.

These and other features of the invention are described in more detail below.

BRIEF DESCRIPTION OF THE ACCOMPANYING DIAGRAMS

Embodiments of the invention are described below, by way of non-limiting examples only and with reference to the accompanying drawings in which.

DETAILED DESCRIPTION OF EXAMPLE EMBODIMENTS OF THE INVENTION

Figure 1:
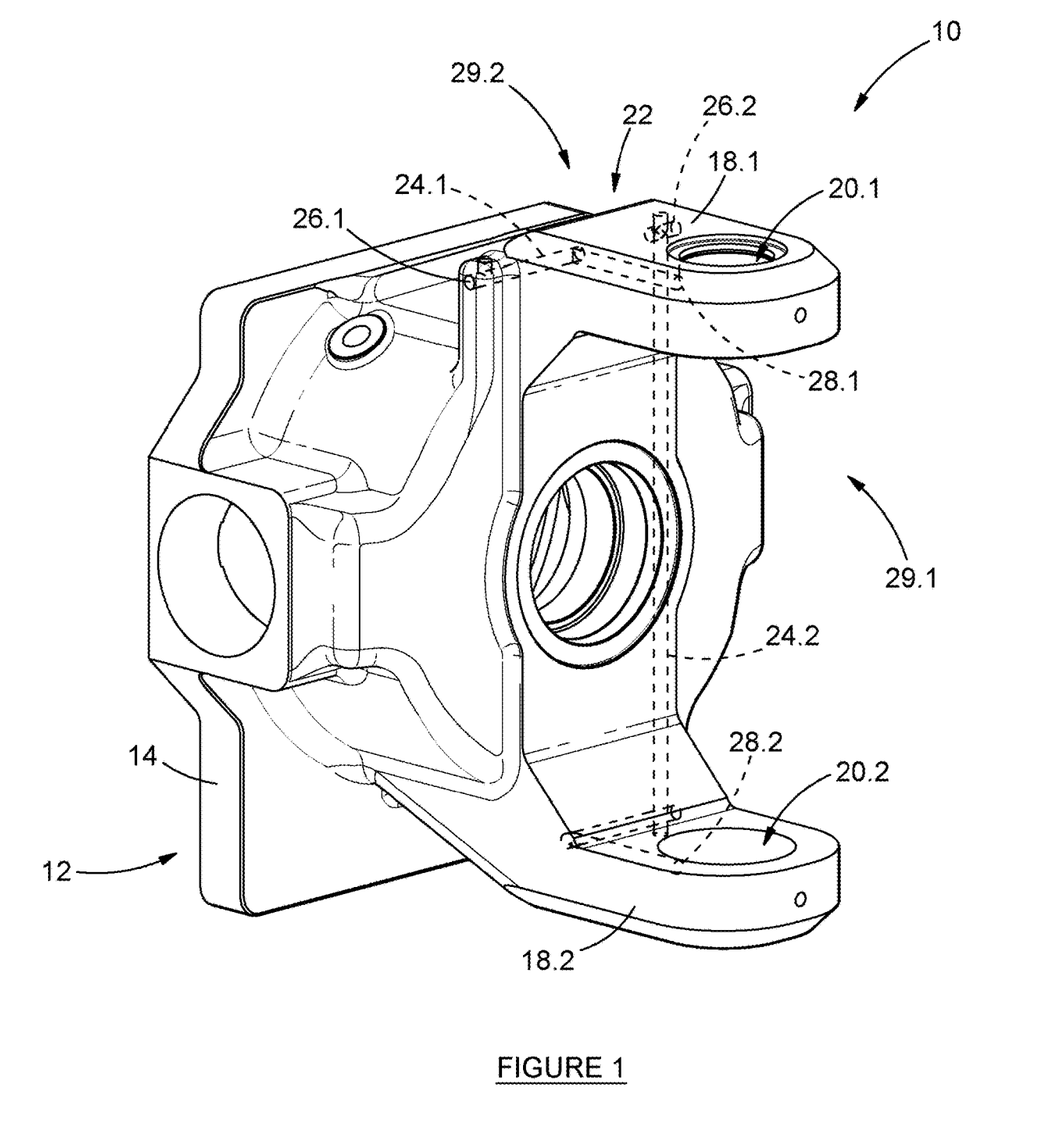
FIG. 1 is a schematic perspective view from above of a wheel support in accordance with a first embodiment of the invention, showing hidden internal lubricant feed passages.
Figure 2:
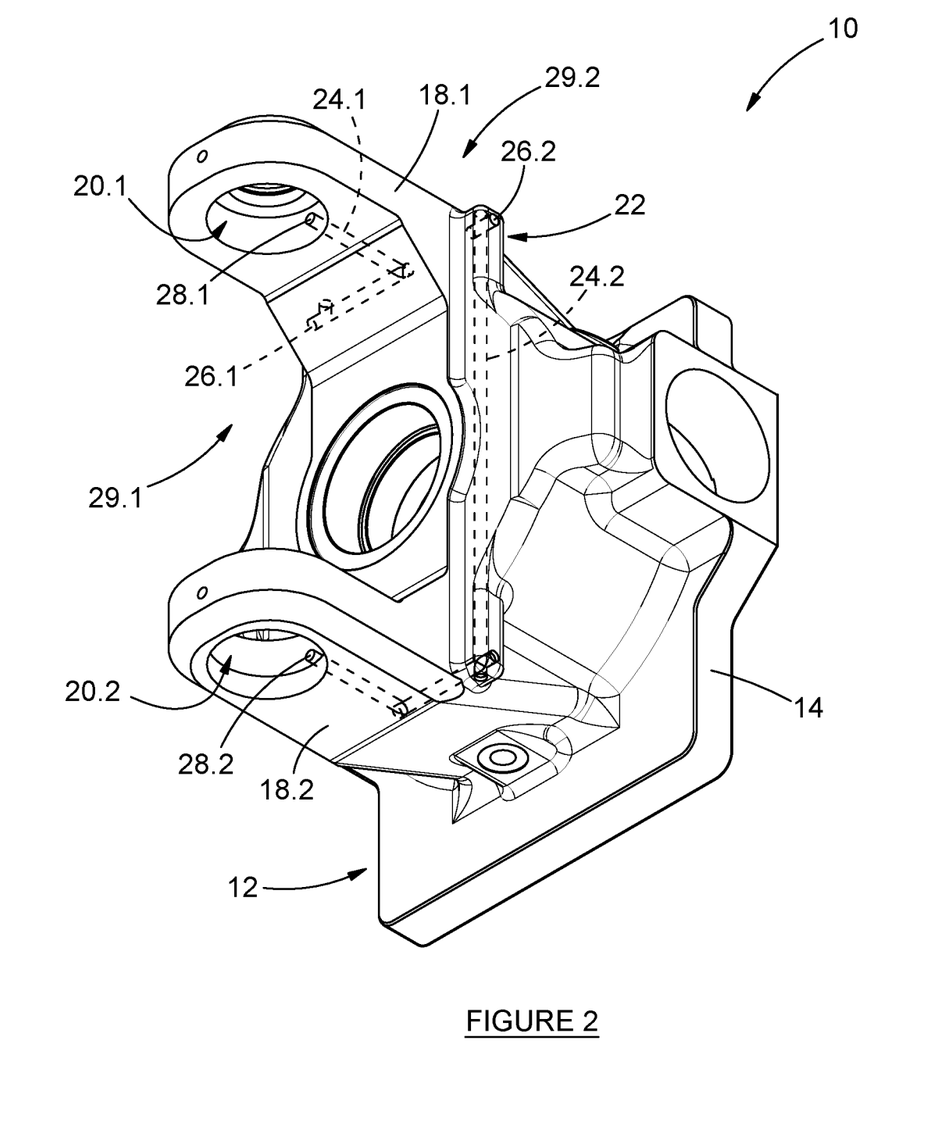
FIG. 2 is a schematic perspective view from below of the wheel support of FIG. 1.
Figure 3:
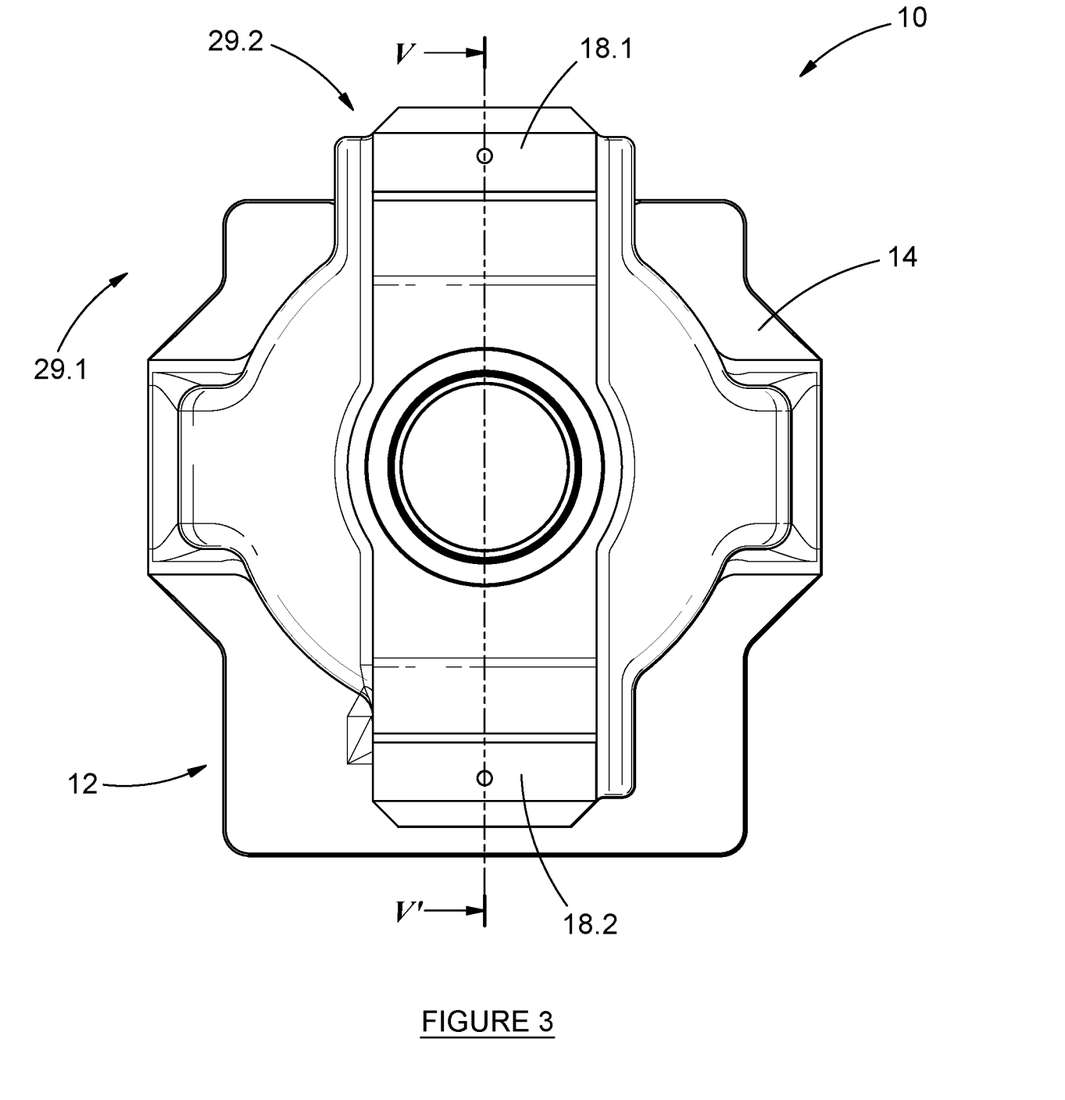
FIG. 3 is a schematic front view of the wheel support of FIG. 1, without any hidden detail shown.
Figure 4:
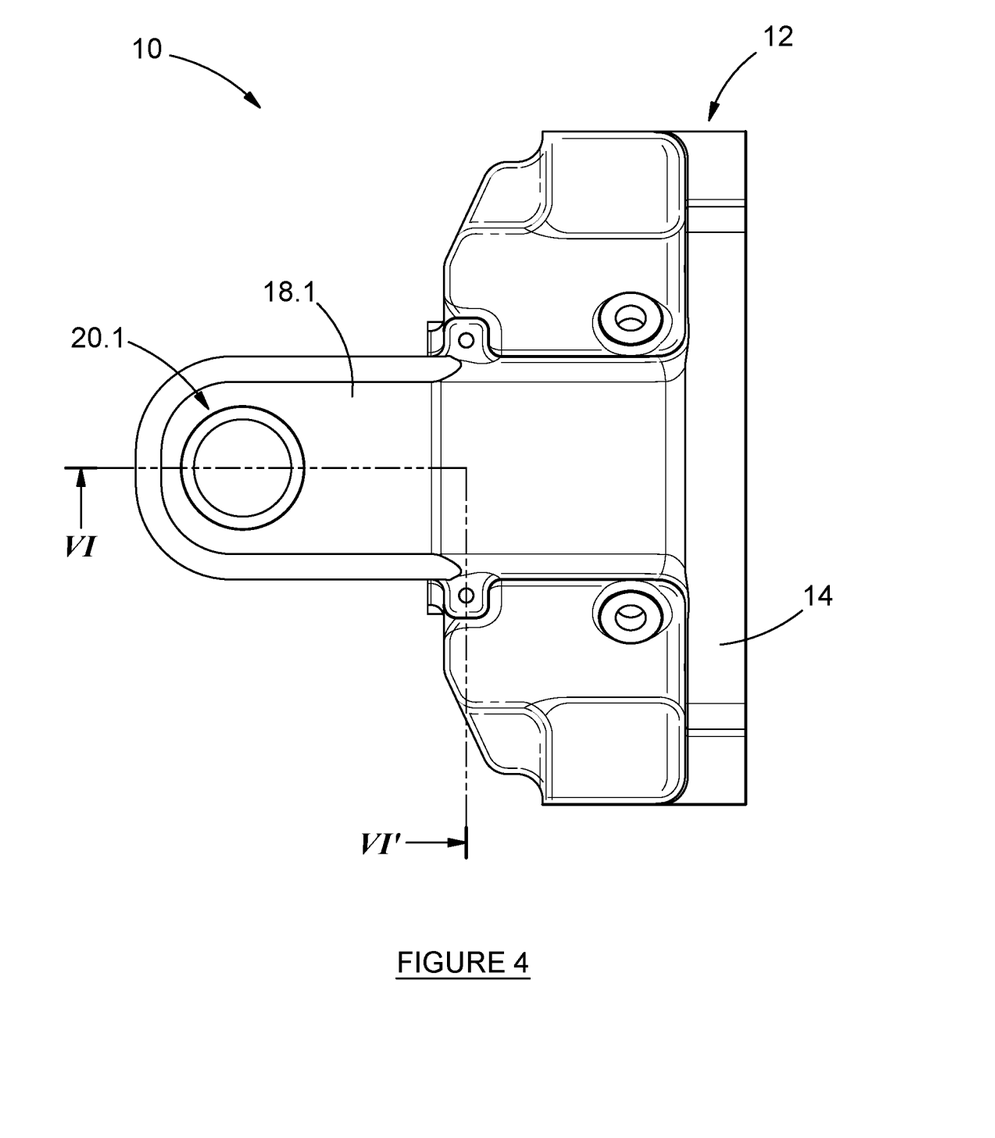
FIG. 4 is a schematic top view of the wheel support of FIG. 3.
Figure 5:
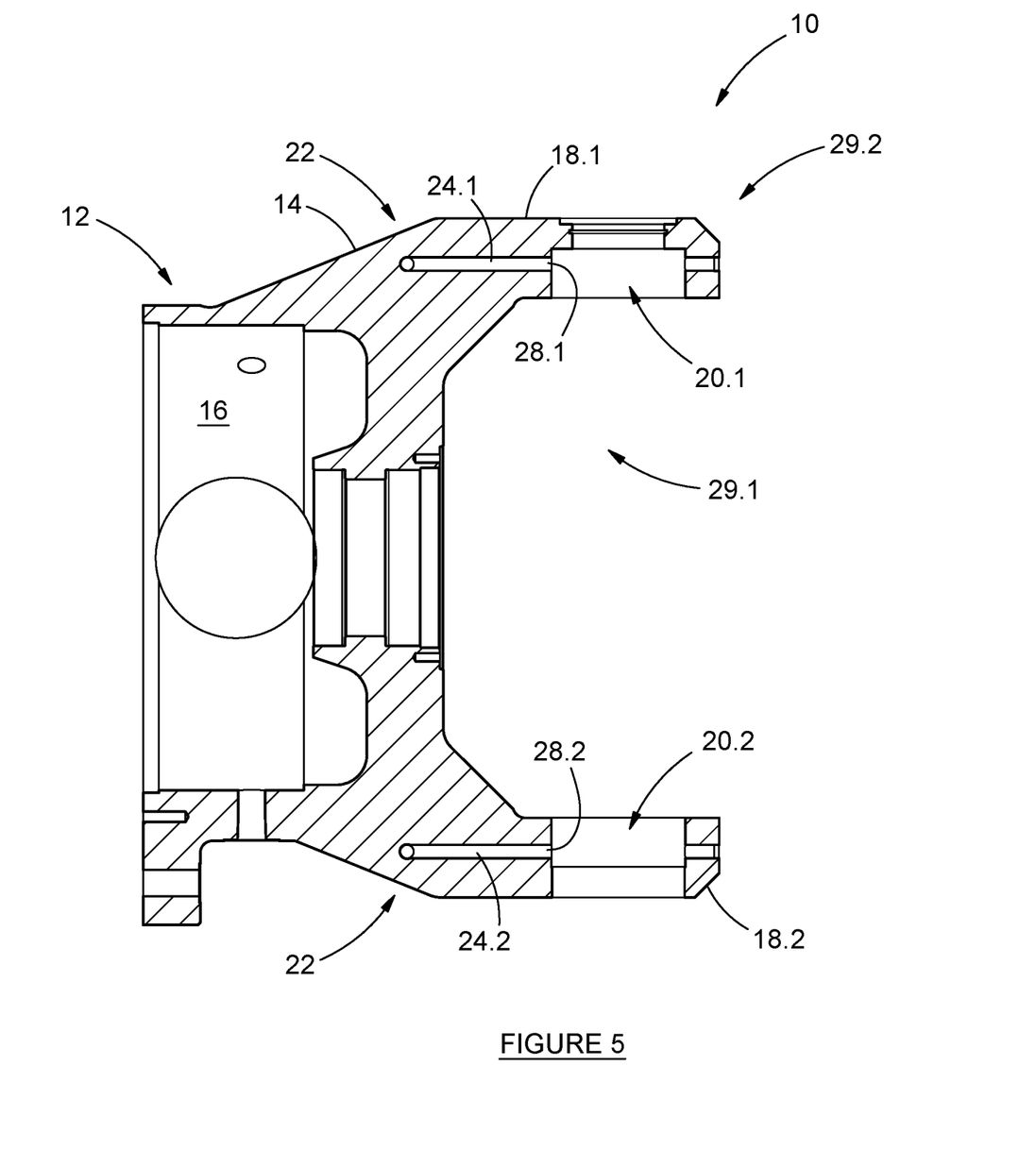
FIG. 5 is a schematic section view on line V-V' shown in FIG. 3.
Figure 6:
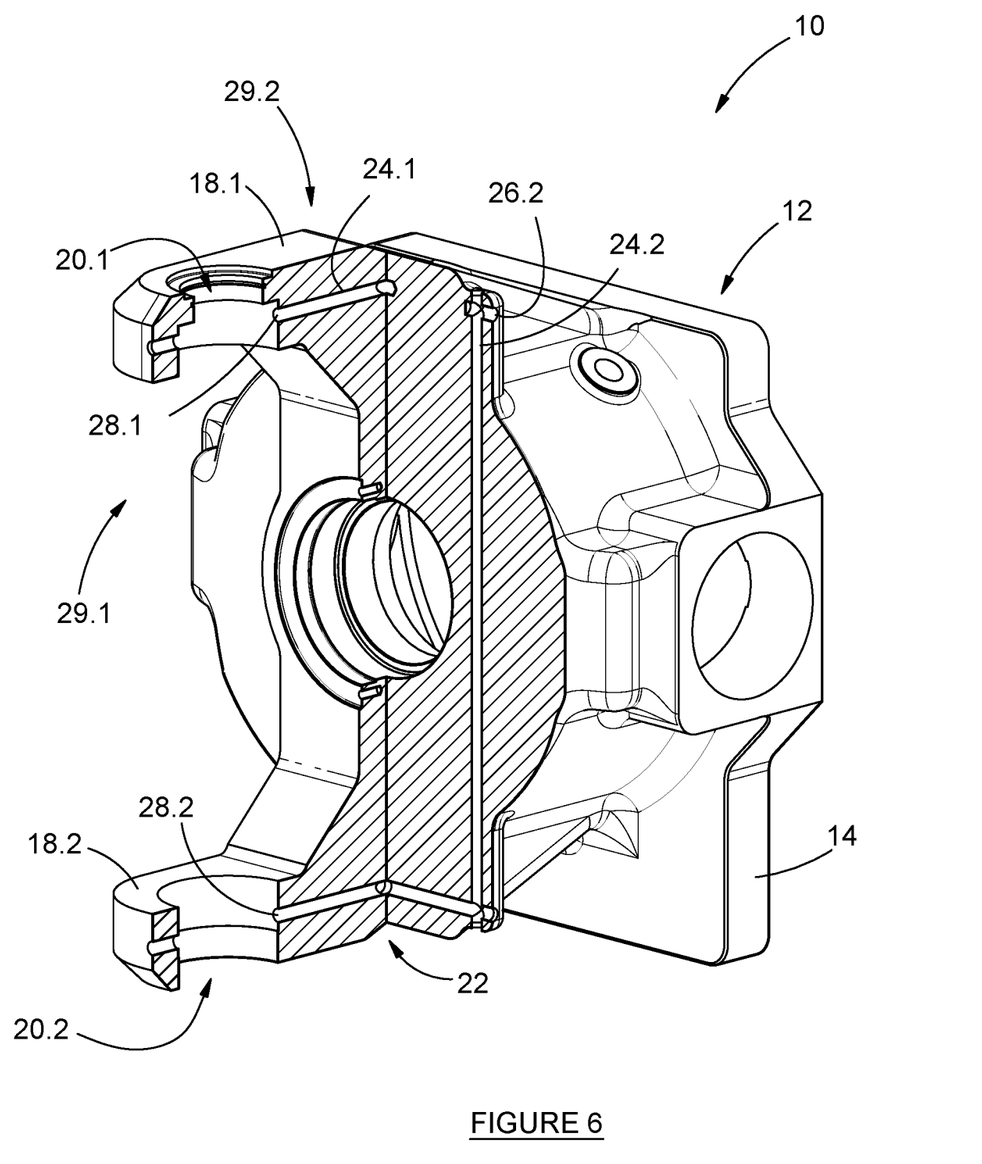
FIG. 6 is a schematic perspective cutaway view on line VI-VI' shown in FIG. 4.
Figure 7:
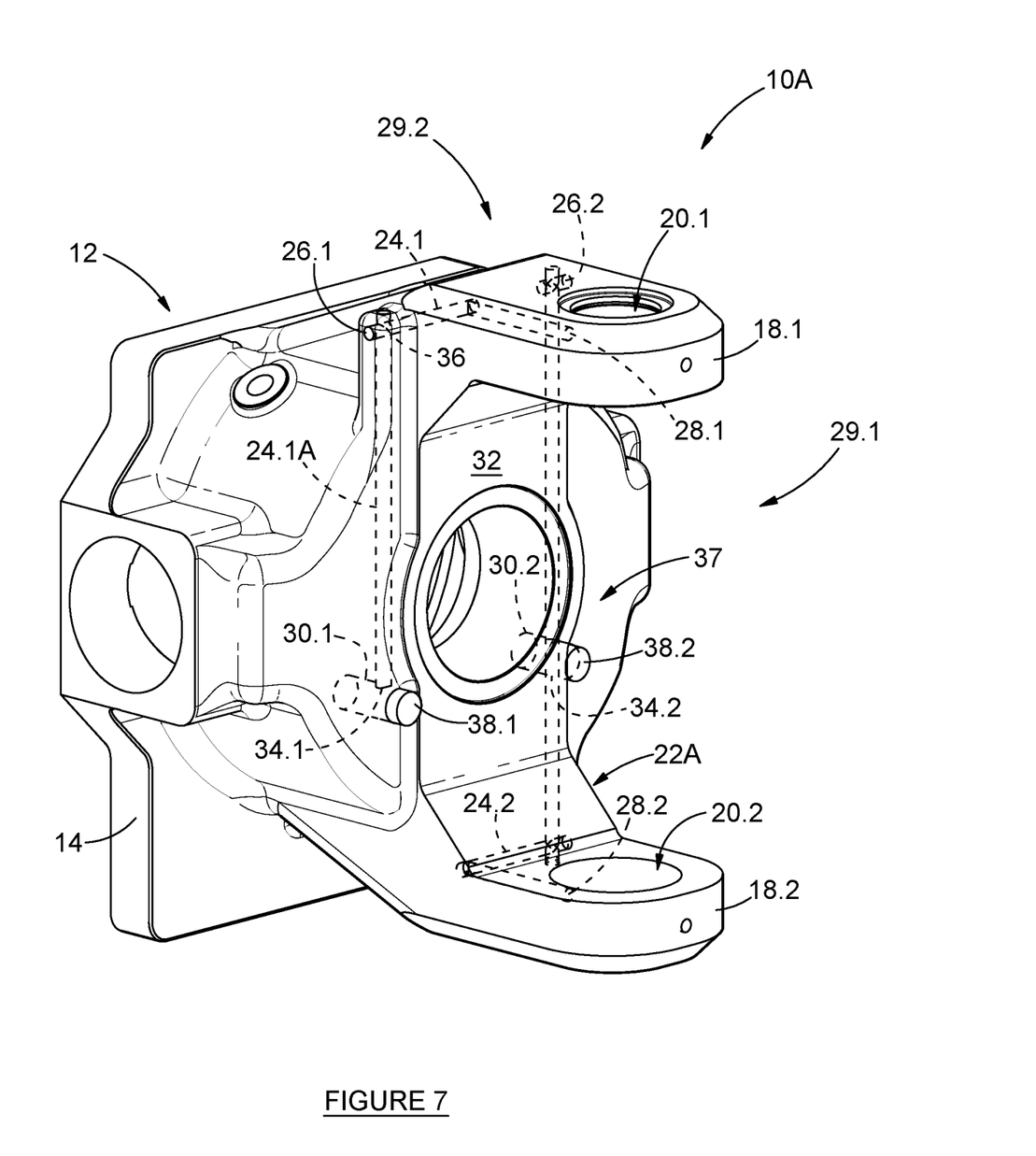
FIG. 7 is a schematic perspective view from above of a wheel support in accordance with a second embodiment of the invention, showing hidden internal lubricant feed passages and lubricant pumps.
Figure 8:
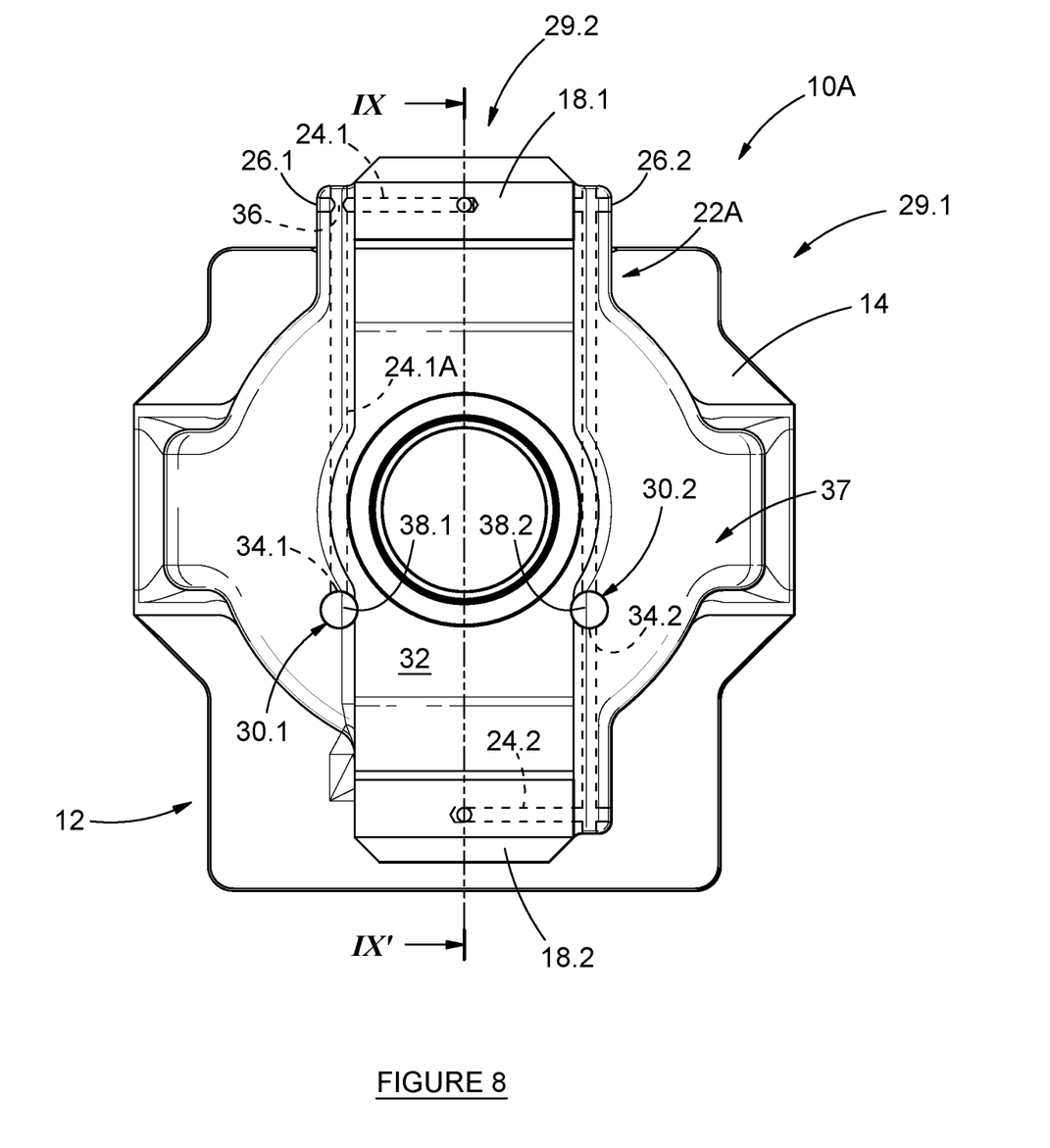
FIG. 8 is a schematic front view of the wheel support of FIG. 7.
Figure 9:
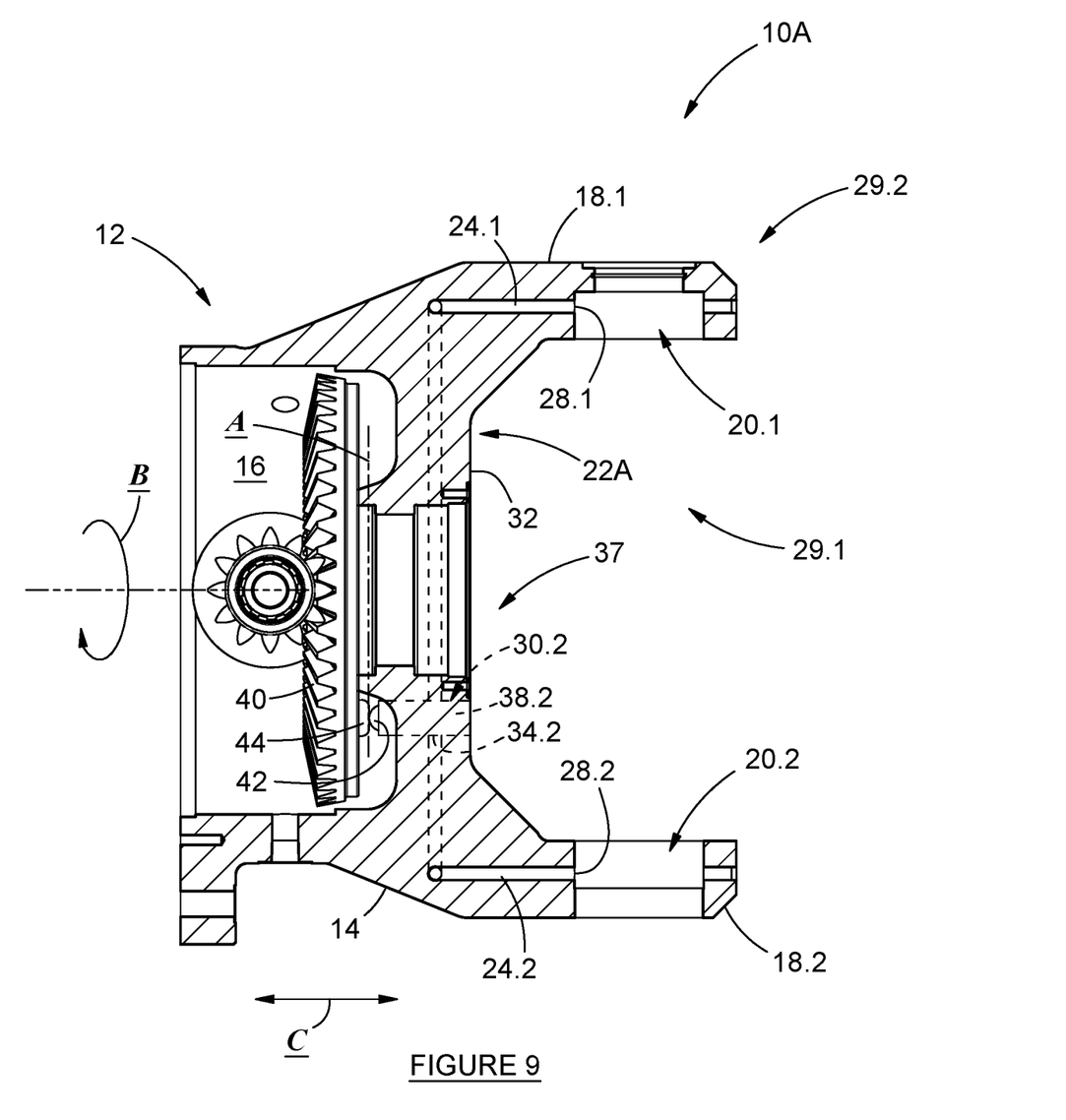
FIG. 9 is a schematic section view on line IX-IX' shown in FIG. 8.

With reference to the Figures, in which like numerals refer to like features, a wheel support, in accordance with a first embodiment of the invention, is designated generally by reference numeral 10 in FIGS. 1 to 6, and a wheel support, in accordance with a second embodiment of the invention, is designated generally by reference numeral 10A in FIGS. 7 to 9.

Referring to FIGS. 1-6, the wheel support 10 comprises a housing 12 that includes a base portion 14 defining a cavity 16 for receiving therein at least one gear (not shown) that would, in use, transmit rotational movement from a drive means (also not shown) to a wheel (also not shown) mounted on the wheel support 10, and lubricant (not shown) for lubricating the gear. Opposing first and second arm members 18.1, 18.2 extend respectively from opposing sides of the base portion 14 such that they are spaced from each other. The wheel is operatively received and supported between the arm members 18.1, 18.2. A free end of each arm member 18.1, 18.2 includes a bearing receiving formation 20.1, 20.2 for receiving therein a bearing (not shown), in use. The first arm member 18.1 extends substantially in an operatively slanted upwardly direction from the base portion 14, and the second arm member 18.2 extends in an operatively slanted downwardly direction from the base portion 14.

The wheel support 10 further comprises internal lubricant feed means 22, defined in the housing 12, and that extends internally from the base portion 14 into at least one of the arm members 18.1 or 18.2. The lubricant feed means 22 is connectable to a lubricant supply (not shown), such to be in fluid flow communication with it and to operatively feed pressurised lubricant received from the lubricant supply, internally, via the base portion 14, to the bearing receiving formation 20.1 or 20.2 associated with the at least one arm member 18.1 or 18.2. The lubricant supply is a supply of pressurised lubricant located external of the wheel support 10.

According to the example embodiment shown, the lubricant feed means 22 extends internally from the base portion 14 into the second arm member 18.2 to operatively feed pressurised lubricant received from the lubricant supply, internally, via the base portion 14, to the bearing receiving formation 20.2 in the second arm member 18.2. Also, the lubricant feed means 22 extends internally in the first arm member 18.1 to operatively feed pressurised lubricant received from the lubricant supply, internally, to the bearing receiving formation 20.1 in the first arm member 18.1.

The internal lubricant feed means 22 comprises a first internal lubricant feed passage 24.1, defined in the housing 12, that has a first external inlet 26.1 defined in the exterior of the housing 12 that is connectable to the lubricant supply such to be in fluid flow communication with the lubricant supply to receive lubricant from it, and a first outlet 28.1, forwardly spaced from the first external inlet 26.1, disposed for operatively dispensing lubricant in the first bearing receiving formation 20.1 that is located in the first arm member 18.1. The first internal lubricant feed passage 24.1 extends from the first external inlet 26.1, which is also located in the first arm member 18.1, in an operatively horizontal direction to the first bearing receiving formation 20.1. It will be appreciated that in another example embodiment of the invention, the first external inlet 26.1 may be located in the base portion 14, wherein the first internal lubricant feed passage 24.1 will extend, internally, from the base portion 14 into the first arm member 18.1.

The internal lubricant feed means 22 also comprises a second internal lubricant feed passage 24.2 defined in the housing 12 that has a second external inlet 26.2 defined in the exterior of the housing 12 that is connectable to the lubricant supply such to be in fluid flow communication with the lubricant supply to receive lubricant from it, and a second outlet 28.2, forwardly spaced from the second external inlet 26.2, disposed for operatively dispending lubricant in the second bearing receiving formation 20.2 that is located in the second arm member 18.2. The second internal lubricant feed passage 24.2 extends from the second main inlet 26.2, which is located in the first arm member 18.1, in an operatively downwardly direction along the base portion 14 into the second arm member 18.2, and from there in an operatively horizontal direction to the second bearing receiving formation 20.2.

The internal lubricant feed means 22 is operatively connected to the lubricant supply at the position of the first and second external inlets 26.1, 26.2, being at the operatively upper half 29.1, more specifically, in proximity of the operatively upper region or end 29.2 of the housing 12, as shown.

In use, the base portion 14, along with its other associated components (gear, wheel, etc.—not shown), is mounted, by means of suitable fasteners (also not shown) to a vehicle frame (also not shown), such as a vehicle frame of a shuttle car, and the first and second external inlets 26.1, 26.2 are connected to the lubricant supply being located on the vehicle. The lubricant, typically in the form of grease, is received at the operatively upper region 29.2 of the wheel support 10. From the first and second external inlets 26.1, 26.2, the lubricant is fed, via the first and second internal lubricant feed passages 24.1, 24.2 to the first and second outlets 28.1, 28.2, where it is dispensed in the first and second bearing receiving formations 20.1, 20.2 respectively.

It will be appreciated that the wheel support 10 and method of lubricating the wheel support 10 according to the invention provide for effective lubrication, in that lubricant is fed to both the first and second bearing receiving formations 20.1, 20.2 from the operatively upper end of the wheel support 10. Accordingly, no part of the lubrication system is exposed externally at the lower region of the wheel support 10, where it would be vulnerable to be hit by rocks or other objects that could damage it.

Reference is now made to FIGS. 7 to 9 of the drawings, which show a second embodiment of the wheel support 10A. The wheel support 10A is similar to the wheel support 10A described hereinbefore, save that its internal lubricant feed means 22A, which includes the internal lubricant feed means 22, is further able to feed lubricant (not shown) from the cavity 16 to the bearing receiving formations 20.1, 20.2.

The internal lubricant feed means 22A extend internally from the base portion 14 into each of the arm members 18.1, 18.2, for feeding lubricant from the lubricant supply, via the base portion 14, to the bearing receiving formations 20.1, 20.2. The internal lubricant feed means 22A is connected to and in fluid flow communication with the cavity 16, and the lubricant supply is lubricant located in the cavity 16.

The feeding of lubricant from the cavity 16 to the first bearing receiving formation 20.1 is facilitated by the lubrication means 22A including a first aperture 30.1 that extends through the housing 12 from a front face 32 thereof into the cavity 16 and the first internal lubricant feed passage 24.1 including an internal extension passage 24.1A, defined in the housing 12, and extending between the first aperture 30.1 and the first internal lubricant feed passage 24.1, as defined above. The extension passage 24.1A has a first internal inlet 34.1 in the first aperture 30.1, and an internal outlet 36, forwardly spaced from the first internal inlet 34.1, that opens into the first lubricant feed passage 24.1, adjacent to the first external inlet 26.1. The first internal lubricant feed passage 24.1 is thus, through the extension passage 24.1A, connected to and in fluid flow communication with the cavity 16. Also, the first internal inlet 34.1 is in fluid flow communication with the first outlet 28.1 via the extension passage 24.1A and first internal lubricant feed passage 24.1, whereby the first outlet 28.1 is disposed for operatively dispensing lubricant, received from the cavity 16, in the first bearing receiving formation 20.1.

The first aperture 30.1 is positioned at a height in the housing 12 whereby it is below the operative lubricant level in the cavity 16 to enable lubricant to be easily extracted from the cavity 16 at the position where the first aperture 30.1 is located.

On the other hand, the feeding of lubricant from the cavity 16 to the second bearing receiving formation 20.2 is facilitated by the lubrication means 22A also including a second aperture 30.2 that extends through the housing 12 from the front face 32 thereof into the cavity 16, and through a vertically extending portion of the second internal lubricant feed passage 24.2. At its intersection with the second aperture 30.2, the second internal lubricant feed passage 24.2 defines a second internal inlet 34.2 that is connected to and in fluid flow communication with the cavity 16 via the second aperture 30.2. The second internal inlet 34.2 is also in fluid flow communication with the second outlet 28.2 via the operative lower portion of the second internal lubricant feed passage 24.2, whereby the second outlet 28.2 is disposed for operatively dispensing lubricant, received from the cavity 16, in the second bearing receiving formation 20.2.

Similar to the position of the first aperture 30.1, the second aperture 30.2 is also positioned at a height in the housing 12 whereby it is below the operative lubricant level in the cavity 16 to enable lubricant to be easily extracted from the cavity 16 at the second aperture 30.2.

The internal lubricant feed means 22A further includes lubricant pump means 37 that includes a first lubricant pump 38.1, being located in the first aperture 30.1 and in fluid flow communication with the cavity 16 and the first internal inlet 34.1, for operatively causing lubricant to be fed, under pressure, from the cavity 16 to the first bearing receiving formation 20.1. The lubricant pump means 37 also includes a second lubricant pump 38.2, being located in the second aperture 30.2 and in fluid flow communication with the cavity 16 and the second internal inlet 34.2, for operatively causing lubricant to be fed, under pressure, from the cavity 16 to the second bearing receiving formation 20.2. Although not shown, it will be appreciated that in some embodiments of the invention, the internal passages 24.1, 24.1A and 24.2 could be configured whereby the lubricant pump means 37 includes only a single lubricant pump 38.1 or 38.2, and the internal passages 24.1, 24.1A and 24.2 are connected to and in fluid flow communication with the lubricant pump 38.1 or 38.2 such to receive lubricant therefrom and feed the same, internally, to the bearing receiving formations 20.1 and 20.2. The internal passages 24.1, 24.1A and 24.2 could be connected to and in fluid flow communication with each other.

Referring particularly to FIG. 9, the lubricant pumps 38.1, 38.2, which are, at least partially, embedded in the base portion 14, protrudes into the cavity 16 wherein they are respectively disposed to operatively engage a gear 40 that is operatively located inside the cavity 16. As explained in more detail further below, the pumps 38.1, 38.2 are driven by their engagement with the gear 40 which, in turn, cause lubricant to be fed, by the pumps 38.1, 38.2 to the respective bearing receiving formations 20.1, 20.2.

The lubricant pumps 38.1, 38.2 are, at least partially, embedded in the housing 12, the depth of which being adjustable to thereby alter the distance it protrudes into the cavity 16. The distance the pumps 38.1, 38.2 protrude into the cavity 16 determines the amount of lubricant the pumps 38.1, 38.2 cause to extract from the cavity 16 and be pumped to the bearing receiving formations 20.1, 20.2. More specifically, the further the pumps 38.1, 38.2 protrude into the cavity 16, the more lubricant they will cause to be extracted from the cavity 16 and be pumped to the bearing receiving formations 20.1, 20.2, and vice versa. The depth at which the lubricant pumps 38.1, 38.2 are located in the housing 12 is adjustable by way of a screw interface between pumps 38.1, 38.2 and the housing 12, whereby rotation of the pumps 38.1, 38.2 causes them to move into or out of the housing 12, depending on the direction of rotation.

Each of the lubricant pumps 38.1, 38.2 includes a part, in the form of an actuating element 42, that is disposed in a circular path A that a protrusion (cam) 44, extending from the gear 40 and facing the pumps 38.1, 38.2, moves along when the gear 40 rotates B, in use. The actuating elements 42 thus sequentially engage the protrusion 44 when they are respectively in register with the protrusion 44. It may be that in some embodiments of the invention, the actuating elements 42 constantly engage the gear 40 as it rotates B, but displace when they are in register with the protrusion 44.

Alternatively, in some embodiments of the invention, the actuating elements 42 may be spaced from the gear 40 as it rotates B, but engage the gear 40 which cause them to displace only when they are in register with the protrusion 44.

The actuating elements 42 are linearly displaceable C between a forward position (not shown) wherein they are disposed in the path A of movement of the protrusion 44 and a retracted position (as shown) wherein they are pushed out of (retracted from) the path A of movement by the protrusion 44 in a reciprocal manner. Lubricant is caused to be fed (pumped) towards the bearing receiving formations 20.1, 20.2 by the pumps 38.1, 38.2 when the actuating elements 42 are displaced from their respective forward positions to their respective retracted positions. The actuating elements 42 are biased towards their respective forward position by means of biasing elements (not shown), typically being in the form of compression springs, located in each of the pumps 38.1, 38.2.

Similar to as described hereinbefore in relation to the wheel support 10, in use, the base portion 14 of the wheel support 10A, along with its other associated components (not shown), is mounted to a vehicle frame (also not shown), such as a vehicle frame of a shuttle car. The cavity 16, which contains the gear 40, being in the form of a bevel crown gear, is partially filled with lubricant (not shown), typically in the form of oil, for lubricating the gear 40.

Rotational movement B of the gear causes the pumps 38.1, 38.2 to extract lubricant from the cavity 16 and subsequently pressurise it, from where the pressured lubricant is fed to the bearing receiving formations 20.1, 20.2. More specifically, lubricant is fed from the first pump 38.1 to the first bearing receiving formation 20.1 via the first lubricant feed passage 24.1 and corresponding extension passage 24.1A, and lubricant is fed from the second pump 38.2 to the second bearing receiving formation 20.2 via the second lubricant feed passage 24.2.

The wheel support 10, 10A is a shuttle car wheel support.

It will be appreciated that the wheel support 10A and method of lubricating the wheel support 10A, according to the invention, provide for effective lubrication, in that lubricant is fed internally to both the first and second bearing receiving formations 20.1, 20.2. Accordingly, no part of the lubrication system is exposed externally at the lower region of the wheel support 10, where it would be vulnerable to be hit by rocks that could damage it.

The lubrication system/method described with reference to FIGS. 1-6, whereby lubricant is received externally via external inlets 26.1, 26.2, could be used separate from or in combination with the lubrication system/method described with reference to FIGS. 7-9, whereby lubricant is received internally from the cavity 16 via internal inlets 34.1, 34.2. Where only the latter lubrication system/method is used, the external inlets 26.1, 26.2 may be closed off so as to prevent lubricant from escaping from the support 10. Also, only the former lubrication system/method is used, the passage 24.1A, apertures 30.1, 30.2, and pumps 38.1, 38.2 could be omitted.

It will be appreciated by those skilled in the art that the invention is not limited to the precise details as described herein and that many variations are possible without departing from the scope and spirit of the invention. For example, an external lubricant supply could be provided to augment the lubricant extracted from the cavity 16 by the pumps 38.1, 38.2.

The description is presented in the cause of providing what is believed to be the most useful and readily understood description of the principles and conceptual aspects of the invention. In this regard, no attempt is made to show structural details of the invention in more detail than is necessary for a fundamental understanding of the invention.

The invention claimed is:

1. A wheel support comprising:
a housing including a base portion defining a cavity for receiving at least one gear for transmitting rotational movement to a wheel mountable on the wheel support, and lubricant for lubricating the gear, the housing further including opposing first and second arm members extending from the base portion such that they are spaced from each other with the wheel supportable between the arm members, wherein each arm member includes a bearing receiving formation for receiving a bearing; and
internal lubricant feed means extending internally from the base portion into at least one of the arm members, for feeding lubricant from a lubricant supply, via the base portion, to the bearing receiving formation associated with the at least one arm member,
wherein the internal lubricant feed means is connected to and in fluid flow communication with the cavity, and the lubricant supply is lubricant located in the cavity,
wherein the internal lubricant feed means includes: a first internal lubricant feed passage, defined in the housing, that has a first internal inlet connected to and in fluid flow communication with the cavity such to operatively receive lubricant from it, and a first outlet, forwardly spaced from the first internal inlet, disposed for operatively dispensing lubricant received from the cavity in the bearing receiving formation in the first arm member, and a second internal lubricant feed passage, defined in the housing, that has a second internal inlet connected to and in fluid flow communication with the cavity such to operatively receive lubricant from it, and a second outlet, forwardly spaced from the second internal inlet, disposed for operatively dispensing lubricant received from the cavity in the bearing receiving formation in the second arm member,
wherein the internal lubricant feed means includes lubricant pump means being in fluid flow communication with the cavity and the first and second internal inlets for operatively feeding lubricant, under pressure, from the cavity to the bearing receiving formations in the first and second arm members, and
wherein the lubricant pump means includes at least a first lubricant pump that protrudes, at least partially into the cavity wherein it is disposed to reciprocally engage with a protrusion of the gear and adapted to, as a result of such engagement, cause lubricant to be fed from the cavity to any one or both of the bearing receiving formations.

2. The wheel support as claimed in claim 1, wherein the first lubricant pump is, at least partially, embedded in the housing, the depth of which being adjustable to thereby alter the distance it protrudes into the cavity.

3. The wheel support as claimed in claim 2, wherein the depth of the first lubricant pump in the housing is adjustable by way of a screw interface between the first lubricant pump and the housing, whereby rotation of the first lubricant pump causes it to move into or out of the housing, depending on the direction of rotation.

4. The wheel support as claimed in claim 1, wherein part of the first lubricant pump is disposed in a path that a protrusion extending from the gear moves along when the gear operatively rotates, whereby the part of the first lubricant pump engages the protrusion when they are in register with one another.

5. The wheel support as claimed in claim 4, wherein the part of the first lubricant pump comprises an actuating element that is linearly displaceable between a forward position wherein it is disposed in the path of movement of the protrusion, and a retracted position wherein it is retracted from the path of movement of the protrusion, further wherein lubricant is caused to be fed from the cavity to the bearing receiving formations when the actuating element is operatively displaced from its forward position to its retracted position as a result of its engagement with the protrusion.

6. The wheel support as claimed in claim 1, wherein the first lubricant pump is in fluid flow communication with the cavity and the first internal inlet for operatively feeding lubricant, under pressure, from the cavity to the bearing receiving formation in the first arm member, and the lubricant pump means also includes a second lubricant pump that is similar to the first lubricant pump, except that it is in fluid flow communication with the cavity and the second internal inlet for operatively feeding lubricant, under pressure, from the cavity to the bearing receiving formation in the second arm member.

7. A method of lubricating bearing receiving formations in a wheel support, the wheel support comprising a housing including a base portion defining a cavity for receiving at least one gear and lubricant for lubricating the gear, and opposing first and second arm members extending from the base portion such that they are spaced from each other, wherein each arm member includes a bearing receiving formation for receiving a bearing, the method including the step of feeding lubricant internally from the base portion via at least one of the arm members to the bearing receiving formation associated with the at least one arm member, including: extracting lubricant from the cavity; pressurising the extracted lubricant; and feeding the pressurised lubricant to the bearing receiving formations, wherein lubricant is fed internally from the base portion via each of the arm members to the bearing receiving formations, and wherein the lubricant is extracted, pressurised and fed to the bearing receiving formations due to a protrusion of the gear reciprocally engaging a lubricant pump that is, at least partially, disposed in the cavity.

8. A shuttle car including a wheel support, as claimed in claim 1.

* * * * *